United States Patent
Chen et al.

(10) Patent No.: US 10,005,240 B2
(45) Date of Patent: Jun. 26, 2018

(54) POWDER RECYCLING SYSTEM

(71) Applicant: MICROJET TECHNOLOGY CO., LTD., Hsinchu (TW)

(72) Inventors: Chih-Kai Chen, Hsinchu (TW); Chi-Feng Huang, Hsinchu (TW)

(73) Assignee: MICROJET TECHNOLOGY CO., LTD, Hsinchu (TW)

( * ) Notice: Subject to any disclaimer, the term of this patent is extended or adjusted under 35 U.S.C. 154(b) by 256 days.

(21) Appl. No.: 14/989,562

(22) Filed: Jan. 6, 2016

(65) Prior Publication Data

US 2016/0200053 A1 Jul. 14, 2016

(30) Foreign Application Priority Data

Jan. 8, 2015 (TW) .............................. 104100573 A

(51) Int. Cl.
| | |
|---|---|
| *B29C 67/00* | (2017.01) |
| *B29C 64/35* | (2017.01) |
| *B29K 105/00* | (2006.01) |
| *B33Y 30/00* | (2015.01) |
| *B33Y 40/00* | (2015.01) |
| *B29C 64/20* | (2017.01) |
| *B08B 5/02* | (2006.01) |

(Continued)

(52) U.S. Cl.
CPC .......... *B29C 67/0096* (2013.01); *B29C 64/35* (2017.08); *B08B 5/02* (2013.01); *B08B 15/02* (2013.01); *B08B 15/026* (2013.01); *B22F 2003/1056* (2013.01); *B22F 2003/1059* (2013.01); *B29C 64/153* (2017.08); *B29C 64/165* (2017.08); *B29C 64/20* (2017.08); *B29C 64/25* (2017.08); *B29C 64/307* (2017.08); *B29C 64/357* (2017.08); *B29K 2105/251* (2013.01); *B33Y 30/00* (2014.12); *B33Y 40/00* (2014.12)

(58) Field of Classification Search
CPC ....... B29C 64/25; B29C 64/20; B29C 64/153; B29C 64/165; B29C 67/0096; B29C 64/35; B29C 64/307; B29C 64/357; B22F 2003/1056; B22F 2003/1059; B33Y 30/00; B33Y 40/00; B29K 2105/251; B08B 5/02; B08B 15/026

See application file for complete search history.

(56) References Cited

U.S. PATENT DOCUMENTS

| | | | | |
|---|---|---|---|---|
| 5,902,441 | A * | 5/1999 | Bredt | B28B 1/00 156/284 |
| 6,932,935 | B1 * | 8/2005 | Oberhofer | B22C 7/00 264/101 |

(Continued)

FOREIGN PATENT DOCUMENTS

TW 201208870 A 3/2012

*Primary Examiner* — Alison L Hindenlang
*Assistant Examiner* — Jerzi H Moreno Hernandez
(74) *Attorney, Agent, or Firm* — Kirton McConkie; Evan R. Witt

(57) ABSTRACT

A powder recycling system for a three-dimensional rapid prototyping apparatus is provided. The powder recycling system includes a sealed main body, a negative pressure generator, an air pressure generator, a lighting unit and a heater. When an excess powder removing process is performed to remove excess powder from a three-dimensional object, the excess powder is sieved by a screen mesh and collected by a powder collector. Consequently, the excess powder is recycled.

4 Claims, 4 Drawing Sheets

(51) Int. Cl.
   *B22F 3/105* (2006.01)
   *B08B 15/02* (2006.01)
   *B29C 64/165* (2017.01)
   *B29C 64/153* (2017.01)
   *B29C 64/357* (2017.01)
   *B29C 64/307* (2017.01)
   *B29C 64/25* (2017.01)

(56) References Cited

U.S. PATENT DOCUMENTS

| | | | | |
|---|---|---|---|---|
| 2001/0045678 | A1* | 11/2001 | Kubo | B29C 41/36 |
| | | | | 264/37.29 |
| 2002/0090410 | A1* | 7/2002 | Tochimoto | B29C 64/165 |
| | | | | 425/215 |
| 2004/0003738 | A1* | 1/2004 | Imiolek | B22F 3/1055 |
| | | | | 101/480 |
| 2004/0012112 | A1* | 1/2004 | Davidson | B29C 41/12 |
| | | | | 264/109 |
| 2005/0001356 | A1* | 1/2005 | Tochimoto | B29C 41/12 |
| | | | | 264/308 |
| 2011/0300248 | A1* | 12/2011 | Tung | B33Y 30/00 |
| | | | | 425/90 |
| 2012/0052145 | A1* | 3/2012 | Chen | B08B 5/02 |
| | | | | 425/217 |
| 2013/0035025 | A1* | 2/2013 | Chalou | B08B 15/02 |
| | | | | 454/61 |
| 2013/0052291 | A1* | 2/2013 | Morikawa | B29C 67/0077 |
| | | | | 425/135 |

* cited by examiner

POWDER RECYCLING SYSTEM

FIELD OF THE INVENTION

The present invention relates to a powder recycling system, and more particularly to a powder recycling system for a three-dimensional rapid prototyping apparatus.

BACKGROUND OF THE INVENTION

As known, a rapid prototyping (RP) technology is developed from the concepts of forming a pyramid by stacking layers, and the main technical feature is to achieve fast formation. A complicated design can be transformed into a three-dimensional physical model automatically and fast without any cutting tools, molds and fixtures. Thus, the development cycle of new products and research and development cost are largely reduced to ensure the time to market for new products and the first-time-right ratio. Accordingly, a complete and convenient product design tool is provided between technicians and non-technicians (e.g. managers and users), and the product competitiveness and the quick reaction capability of enterprises in the market are improved obviously.

Recently, the rapid prototyping technology develops a method for producing three-dimensional physical models by combining jet printing and precise positioning of carriers. The producing method begins by first spreading a layer of powder on the carrier and then printing high viscosity liquid binder on part of the powder by using jet printing technology, so that the liquid binder and the powder stick together to become solidified. After the above steps are repeatedly done, a three-dimensional physical model is produced by stacking multiple layers.

Since the processes of spreading powder, printing and taking out the finished product are manually performed according to the conventional rapid prototyping technology, the flying dust usually pollutes the working environment and contaminates the whole three-dimensional rapid prototyping apparatus. For maintaining normal operation, a dust-collecting and cleaning task is manually done after a specified stage of the rapid prototyping technology. However, during the cleaning process, the finished product is possibly destroyed or the components of the three-dimensional rapid prototyping apparatus are possibly damaged because of carelessness. Moreover, the increased frequency of performing the cleaning process is labor-intensive, time-consuming and costly. If the frequency of performing the cleaning process decreases, the dust pollution problem cannot be effectively solved.

Therefore, there is a need of providing a powder recycling system for a three-dimensional rapid prototyping apparatus in order to overcome the above drawbacks.

SUMMARY OF THE INVENTION

The present invention provides a powder recycling system for preventing the working environment from being polluted by the flying dust. After a three-dimensional object is placed within a sealed chamber of a sealed main body, an excess powder removing process can be performed to recycle the excess powder. A filter is installed in the sealed chamber and in communication with a negative pressure generator. Consequently, the excess powder removing process is performed in the sealed chamber under a negative pressure condition. Due to the negative pressure of the sealed chamber, the excess powder is not easily leaked out to the surroundings, and the cleanness of the working environment is enhanced. After the excess powder is removed from the three-dimensional object, the excess powder drops down to a powder collector under the sealed chamber, so that the excess powder is recycled and reused. Moreover, an air spray gun is disposed within the sealed chamber for providing a pressurized airflow to facilitate removing the excess powder from the three-dimensional object.

In accordance with an aspect of the present invention, there is provided a powder recycling system. The powder recycling system includes a sealed main body, a negative pressure generator, an air pressure generator, a lighting unit and a heater. The sealed main body has plural partition plates therein. An inner portion of the sealed main body is divided into a sealed chamber. A component accommodation space and an excess powder receiving space are defined by the plural partition plates. The sealed chamber has a front door plate with plural openings. The plural openings are connected with corresponding isolation elements. A screen mesh is located at a bottom side of the sealed chamber. A powder collector is disposed within the excess powder receiving space and under the screen mesh. When a three-dimensional object is accommodated within the sealed chamber and an excess powder removing process is performed to remove excess powder, the excess powder is sieved by the screen mesh and collected by the powder collector, so that the excess powder is recycled. The negative pressure generator is disposed within the component accommodation space for providing negative pressure airflow. The air pressure generator is disposed within the component accommodation space for providing pressurized airflow. The air pressure generator has a tube in communication with the sealed chamber. The tube is connected with an air spray gun that is disposed within the sealed chamber. The pressurized airflow is ejected out from the air spray gun to remove the excess powder from the three-dimensional object. The lighting unit is used for illuminating the sealed chamber. The heater is used for thermally treating the three-dimensional object so as to increase structural strength of the three-dimensional object.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
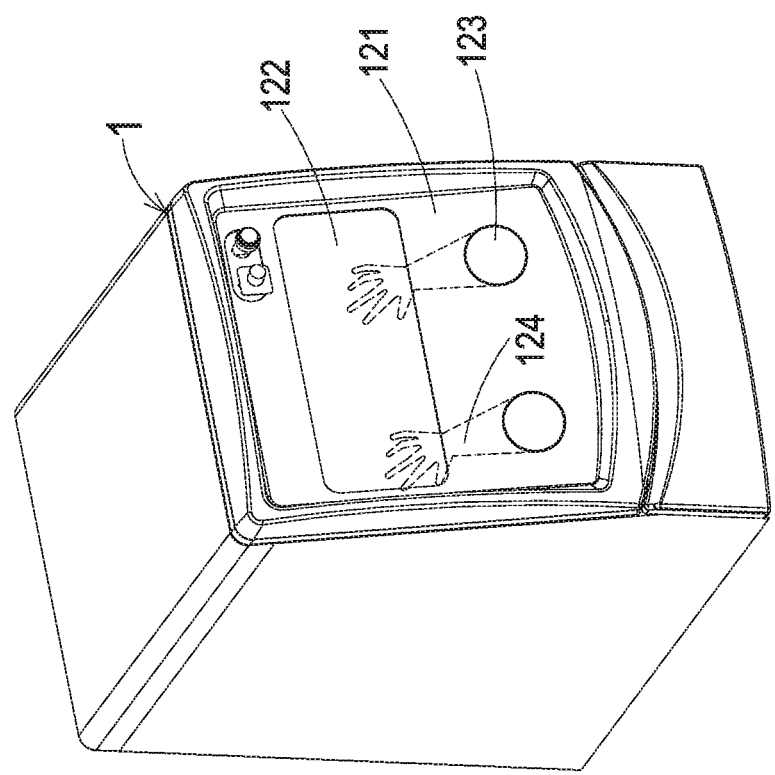
FIG. 1 is a schematic perspective view illustrating a powder recycling system according to an embodiment of the present invention.
Figure 2:
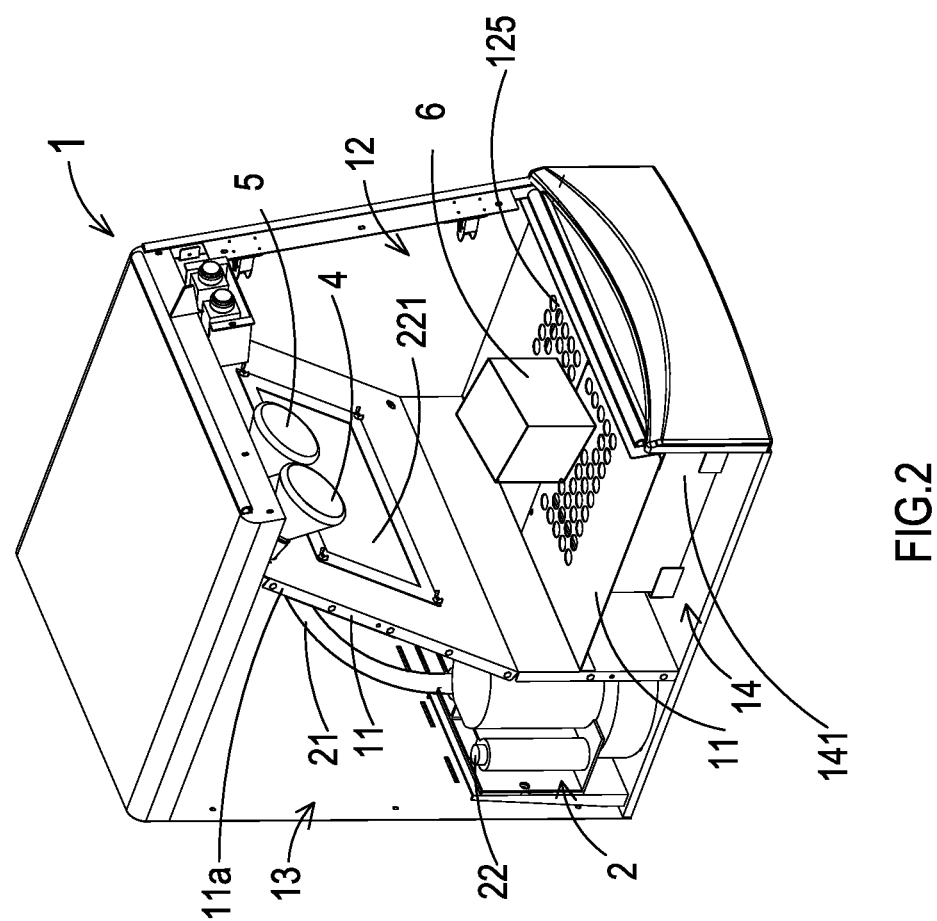
FIG. 2 is a schematic perspective view illustrating the inner structure of the powder recycling system of FIG. 1.
Figure 3:
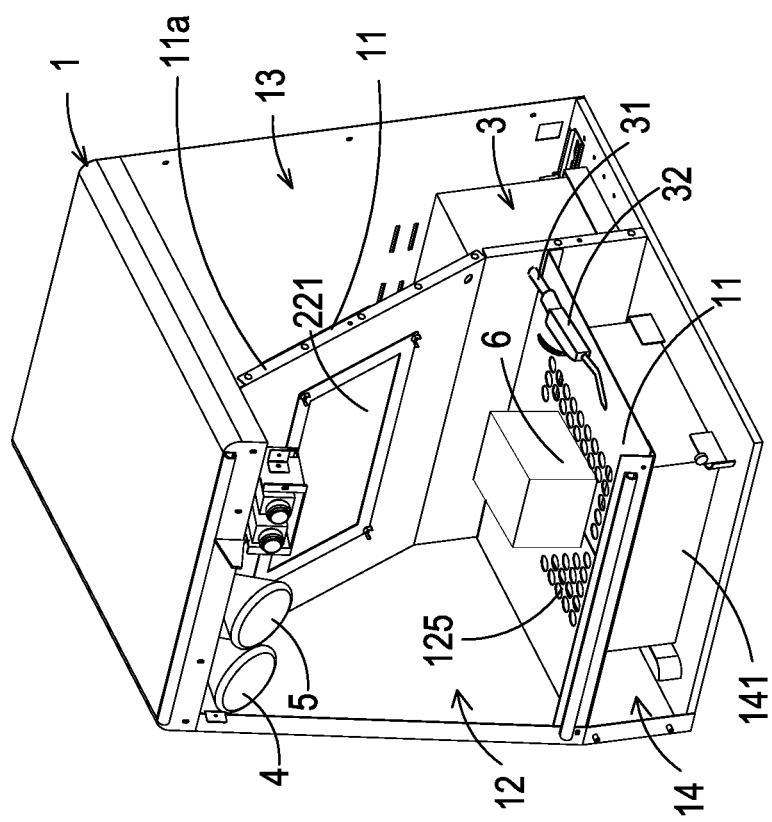
FIG. 3 is a schematic perspective view illustrating the inner structure of the powder recycling system of FIG. 2 and taken along another viewpoint.
Figure 4:
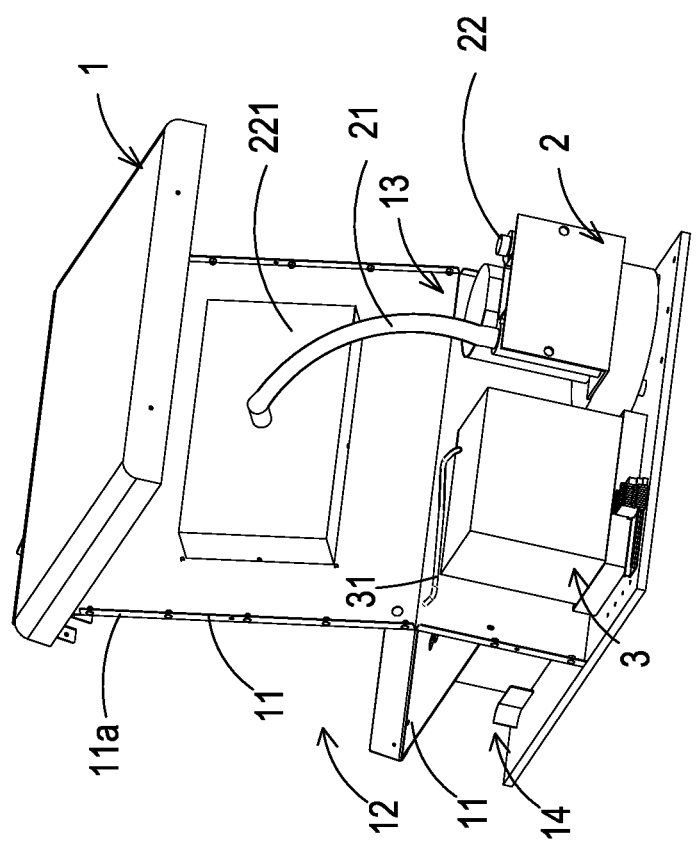
FIG. 4 is a schematic perspective view illustrating the backside of the powder recycling system of FIG. 3.

FIG. 1 is a schematic perspective view illustrating a powder recycling system according to an embodiment of the present invention. FIG. 2 is a schematic perspective view illustrating the inner structure of the powder recycling system of FIG. 1. FIG. 3 is a schematic perspective view illustrating the inner structure of the powder recycling system of FIG. 2 and taken along another viewpoint. FIG. 4 is a schematic perspective view illustrating the backside of the powder recycling system of FIG. 3.

Please refer to FIGS. 1, 2, 3 and 4. The powder recycling system comprises a sealed main body 1, a negative pressure generator 2, an air pressure generator 3, a lighting unit 4 and a heater 5. Preferably but not exclusively, the heater 5 is a heating lamp.

There are plural partition plates 11 in the sealed main body 1. By the plural partition plates 11, the inner portion of the sealed main body 1 is divided into a sealed chamber 12, a component accommodation space 13 and an excess powder receiving space 14. The plural partition plates 11 include a first partition plate 11a, and the first partition plate 11a is located between the sealed chamber 12 and the component accommodation space 13. When a three-dimensional object 6 is accommodated within the sealed chamber 12, an excess powder removing process can be performed to remove the excess powder. The sealed chamber 12 has a front door plate 121. When the front door plate 121 is opened, the three-dimensional object 6 can be placed within the sealed chamber 12. Moreover, the front door plate 121 is equipped with a transparent window 122 and plural openings 123. Each opening 123 is connected with a corresponding isolation element 124. Consequently, the inner portion of the sealed chamber 12 is a seal space that is isolated from the surroundings. In an embodiment, the isolation element 124 is a working glove. After the both hands of a worker insert into the working gloves 124, the excess powder removing process can be manually done. That is, the both hands of the worker can insert into the sealed chamber 12 to manually remove the excess powder through the working gloves. Since the excess powder removing process is performed under a completely sealed condition, the working environment will not be polluted by the flying dust.

A screen mesh 125 is located at a bottom side of the sealed chamber 12. A powder collector 141 is disposed within the excess powder receiving space 14. The powder collector 141 is disposed under the screen mesh 125. When the three-dimensional object 6 is accommodated within the sealed chamber 12 and the excess powder removing process is performed, the excess powder is sieved by the screen mesh 125 to filter off the large-sized powder or dust. The powder passing through the screen mesh 125 falls down to the powder collector 141. Consequently, the excess powder can be recycled and reused.

The negative pressure generator 2 and the air pressure generator 3 are disposed within the component accommodation space 13 divided from sealed chamber 12 by the first partition plate 11a. The negative pressure generator 2 is used for providing negative pressure airflow. The air pressure generator 3 is used for providing pressurized airflow. In an embodiment, the negative pressure generator 2 is a suction pump, and the air pressure generator 3 is an air compressor.

Please refer to FIG. 2 and FIG. 4. The negative pressure generator 2 has an input channel 21 and an output channel 22. An end of the input channel 21 is penetrated through the first partition plate 11a. Consequently, the input channel 21 is in communication with the sealed chamber 12. Moreover, a filter 221 is located at the end of the input channel 21 for filtering off the suspended powder or dust that is contained in the negative pressure airflow. Consequently, the excess powder removing process is performed in the sealed chamber 12 under a negative pressure condition.

The air pressure generator 3 has a tube 31 in communication with the sealed chamber 12. In addition, the tube 31 is connected with an air spray gun 32 that is disposed within the sealed chamber 12. Consequently, the pressurized airflow generated by the air pressure generator 3 can be ejected out from the air spray gun 32. When the hand of the worker inserts the working glove 124 and takes the air spray gun 32, the worker can use the pressurized airflow to remove the excess powder from the three-dimensional object 6. Under this circumstance, the excess powder removing process can be manually done.

The lighting unit 4 and the heater 5 are disposed within the sealed chamber 12. The lighting unit 4 is used for illuminating the sealed chamber 12. During the excess powder removing process, the heater 5 provides heat energy to thermally treat the three-dimensional object 6. Consequently, the chemical bonding of the three-dimensional object 6 is enhanced, the reaction time of the three-dimensional object 6 is promoted, and the structural strength of the three-dimensional object 6 is increased.

From the above descriptions, the present invention provides a powder recycling system for preventing the working environment from being polluted by the flying dust. After a three-dimensional object is placed within a sealed chamber of a sealed main body, an excess powder removing process can be performed to recycle the excess powder. A filter is installed in the sealed chamber and in communication with a negative pressure generator. Consequently, the excess powder removing process is performed in the sealed chamber under a negative pressure condition. Due to the negative pressure of the sealed chamber, the excess powder is not easily leaked out to the surroundings, and the cleanness of the working environment is enhanced. After the excess powder is removed from the three-dimensional object, the excess powder drops down to a powder collector under the sealed chamber, so that the excess powder is recycled and reused. Moreover, an air spray gun is disposed within the sealed chamber for providing a pressurized airflow to facilitate removing the excess powder from the three-dimensional object.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A powder recycling system, comprising:
a sealed main body having plural partition plates therein, wherein an inner portion of the sealed main body is divided into a sealed chamber, a component accommodation space and an excess powder receiving space by the plural partition plates, and a first partition plate of the plural partition plates is located between the sealed chamber and the component accommodation space, wherein the sealed chamber has a front door plate with plural openings, and the plural openings are connected with a corresponding isolation elements, wherein a screen mesh is located at a bottom side of the sealed chamber, and a powder collector is disposed within the excess powder receiving space and under the screen mesh, wherein when a three-dimensional object is accommodated within the sealed chamber and an excess powder removing process is performed to remove excess powder, the excess powder is sieved by the screen mesh and collected by the powder collector, so that the excess powder is recycled;

a negative pressure generator disposed within the component accommodation space for providing negative pressure airflow, wherein the negative pressure generator comprises an input channel and an output channel, wherein the input channel is penetrated through the first partition plate and is in communication with the sealed chamber, and a filter is installed in the input channel of the negative pressure generator for filtering the negative pressure airflow;

an air pressure generator disposed within the component accommodation space for providing pressurized airflow, wherein the air pressure generator has a tube in communication with the sealed chamber, and the tube is connected with an air spray gun that is disposed within the sealed chamber, wherein the pressurized airflow is ejected out from the air spray gun to remove the excess powder from the three-dimensional object;

a lighting unit for illuminating the sealed chamber; and a heater for thermally treating the three-dimensional object so as to increase structural strength of the three-dimensional object.

2. The powder recycling system according to claim 1, wherein the front door plate of the sealed chamber is equipped with a transparent window.

3. The powder recycling system according to claim 1, wherein the isolation elements are working gloves for allowing both hands of a worker insert into the sealed chamber to manually remove the excess powder through the working gloves.

4. The powder recycling system according to claim 1, wherein the heater is a heating lamp configured for enhancing the chemical bonding of the three-dimensional object and promoting the reaction time of the three-dimensional object.

* * * * *